United States Patent [19]

Wakefield, Jr.

[11] Patent Number: 4,840,726

[45] Date of Patent: Jun. 20, 1989

[54] METHOD FOR DETERMINING AND CONTROLLING THE AMOUNT OF FINELY DIVIDED PARTICULATE SOLIDS ADDED TO A STREAM OF FLUID

[75] Inventor: John J. Wakefield, Jr., Kingwood, Tex.

[73] Assignee: Atlantic Richfield Company, Los Angeles, Calif.

[21] Appl. No.: 181,803

[22] Filed: Apr. 15, 1988

Related U.S. Application Data

[63] Continuation-in-part of Ser. No. 932,852, Nov. 20, 1986, abandoned.

[51] Int. Cl.$^4$ ................................................ C10G 9/32
[52] U.S. Cl. ..................................... 208/152; 208/153; 208/164; 208/DIG. 2; 208/113
[58] Field of Search ............... 208/113, 152, 164, 153, 208/DIG. 1

[56] References Cited

U.S. PATENT DOCUMENTS

| | | | |
|---|---|---|---|
| 2,471,131 | 5/1949 | Viles | 208/152 |
| 2,601,676 | 6/1952 | Trainer et al. | 208/DIG. 1 |
| 2,666,733 | 1/1954 | Scovill | 208/152 |
| 2,916,441 | 12/1959 | Kruse | 208/152 |
| 2,944,002 | 7/1960 | Faulk | 208/91 |
| 3,294,675 | 12/1966 | Adams et al. | 208/152 |
| 3,850,582 | 11/1974 | Luckenbach | 208/164 |
| 4,082,513 | 4/1978 | Andon et al. | 208/152 |
| 4,119,530 | 10/1978 | Czajkowski et al. | 208/152 |
| 4,398,852 | 8/1983 | Milligan | 208/152 |
| 4,729,825 | 3/1988 | Nielsen | 208/113 |
| 4,744,887 | 5/1988 | Van Driesen et al. | 208/152 |

Primary Examiner—Anthony McFarlane
Attorney, Agent, or Firm—John R. Casperson

[57] ABSTRACT

The amount of finely divided particulate solids added to a stream of fluid to form a mixture of the particulate solids and the fluid is determined by a method comprising (a) determining the temperature and quantity of fluid in a stream of fluid; (b) determining the temperature of the particulate solids; (c) determining the temperature of the mixture; and (d) calculating the amount of the particulate solids in the mixture. The method can also be used to control the amount of finely divided particulate solids added to the stream of a fluid. The fluid is at a different temperature than the finely divided solids.

12 Claims, 1 Drawing Sheet

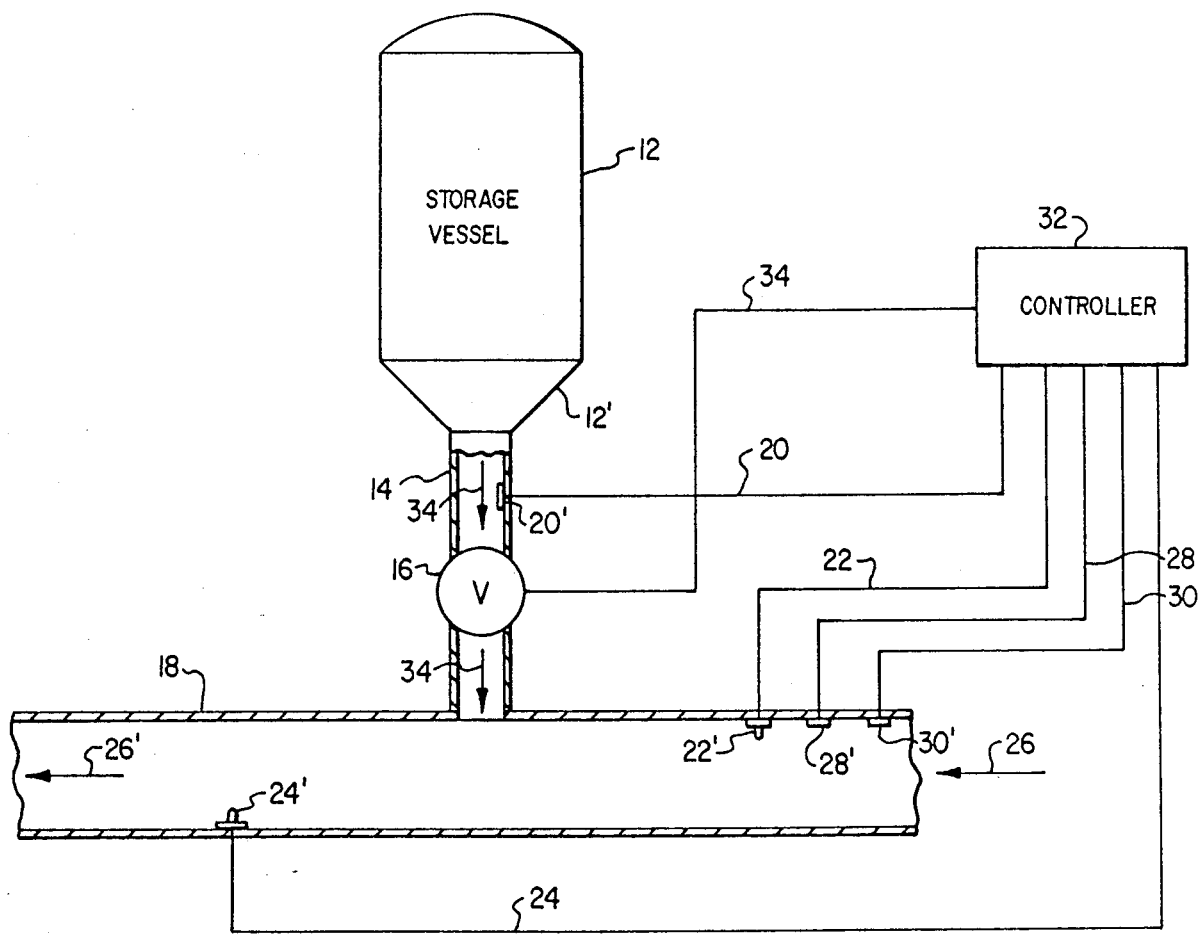

METHOD FOR DETERMINING AND CONTROLLING THE AMOUNT OF FINELY DIVIDED PARTICULATE SOLIDS ADDED TO A STREAM OF FLUID

This application is a continuation-in-part of U.S. patent application Ser. No. 06/932,852, "Method for Determining and Controlling the Amount of Finely Divided Particulate Solids Added to a Stream of Fluid" filed Nov. 20, 1986 now abandoned, by John J. Wakefield.

This invention relates to a method for determining the amount of finely divided particulate solids added to a stream of a fluid.

This invention also relates to a method for controlling the amount of finely divided particulate solids added to a stream of fluid.

This invention also relates to a method for determining and controlling the amount of particulate catalyst added to a fluid catalytic cracking process.

In many processes, it is necessary to transfer finely divided particulate solids from a storage vessel to a processing unit. Such processes include a variety of chemical processes wherein particulate catalyst is used. Such problems can also arise in other industries where particulate solids are produced or handled when it is necessary to transfer particulate solids from a first point to another point by the use of a transfer line in which a flowing fluid is used to transport the particulate solids through the line.

In such processes, it is frequently desirable that the amount of particulate solids transferred be accurately measured or closely controlled or both. In previous attempts to achieve such transportation and control, various devices such as conveyors and fluidized lines have been used. Such processes have frequently failed to achieve the desired reliability and ease of handling and the desired control.

One instance in which it is highly describable that finely divided particulate solids, i.e., particulate catalyst, be added to a process in an accurate and controlled manner, is the process generally referred to as "fluid catalytic cracking." Such a fluid catalyst cracking process is described in the Chemical Engineers Handbook, John H. Perry, Editor, McGraw-Hill Book Company, 1950, Page 1619. Such processes are considered to be known to those skilled in the art and are widely used in the processing of petroleum. It is desirable that the addition of particulate catalyst to such units be accomplished reliably and desirably in a steady and controlled manner. In other words, slugs of fresh catalyst can adversely effect the process efficiency and the failure to add adequate amounts of particulate catalyst when desired can also adversely effect the efficiency of the process. It is highly desirable that fresh particulate catalyst be added at a steady rate sufficient to supply the desired make-up catalyst on a constant basis.

It has now been found that the amount of finely divided solids added to a stream of fluid to form a mixture of the particulate solids and the fluid can be determined by a method comprising (a) determining the temperature and quantity of fluid in the stream of fluid; (b) determining the temperature of the particulate solids; (c) determining the temperature of the mixture; and (d) calculating the amount of the particulate solids in the mixture. Such a method can also be used to control the amount of finely divided particulate solids added to the stream of fluid. The fluid is at a different temperature than the finely divided solids.

BRIEF DESCRIPTION OF THE DRAWING

The FIGURE is a schematic diagram of an embodiment of the process of the present invention.

DETAILED DESCRIPTION OF THE PREFERRED EMBODIMENTS

The term "finely divided particulate solids" as used herein refers to particulate solids of a size small enough so that the finely divided particulate solids an be entrained in a flowing stream of fluid. Such finely divided particulate solids are generally smaller than about 28 Tyler mesh.

In the FIGURE, finely divided particulate solids are stored in a storage vessel 12 which includes a reduced diameter lower portion 12' which functions to direct particulate solids from vessel 12 to a discharge line 14 from vessel 12. Line 14 includes a valve 16 which regulates the rate at which particulate solids are released from storage vessel 12. Particulate solids are released from storage vessel 12 as shown by arrows 34 via line 14 into a transfer line 18 to form a mixture of particulate solids and the fluid. Transfer line 18 is adapted to the flow of a fluid through transfer line 18 as shown by arrow 26 to move particulate solids from vessel 12 along transfer line 18 toward a desired point.

In the practice of the present invention, a temperature sensor 20 including a sensing element 20' is positioned to determine the temperature of particulate solids from storage vessel 12 discharged through line 14 into line 18. As shown, sensor 20 determined the temperature of particulate solids as they pass through discharge line 14.

A temperature sensor 22 including as sensing element 22' is shown for determining the temperature of the fluid in transfer line 18 prior to mixture of the fluid with particulate solids from vessel 12. A second temperature sensor 24 including as sensing element 24' is shown for determining the temperature of the resulting mixture of fluid and particulate solids downstream from the junction of transfer line 18 and discharge line 14. A pressure sensor 28 including a sensing element 28' is shown in operative contact with transfer line 18 and a flow meter 30 including a sensing element 30' is shown in operative contact with transfer line 18. These lines and sensing elements are used to determine the amount of fluid flowing in transfer line 18 and may comprise any suitable sensing elements known to the art for such measurements. As known to those skilled in the art, a flow meter may be sufficient to determine the amount of liquid flowing in transfer line 18 if liquid is used and similarly, the pressure and volume flowing in transfer line 18 can be used to determine the amount of gas flowing in transfer line 18 if gas is used as the fluid. The information determined from these temperature sensors and the measurement of the amount of fluid flowing through line 18 enables the calculation of the amount of particulate solids added to transfer line 18 when the temperature of the particulate solids added to transfer line 18 is different than the temperature of the fluid flowing through line 18. The heat capacities of the fluid flowing through line 18 and the particulate solids added to line 18 can be determined by conventional means known to the art, obtained from standard references or the like. When the particulate solids comprise catalyst, the heat capacity may be obtained from the catalyst supplier.

Desirably, the temperature difference between the fluid flowing through line 18 and the particulate solids from vessel 12 is at least double the difference between the temperature of the mixture flowing in line 18 as shown by arrow 26' after admixture of the particulate solids and the particulate solids from vessel 12. Desirably, the temperature difference between the fluid in line 18 and the particulate solids is at least 50° F. and preferably is at least 100° F. It may be necessary to heat the fluid flowing through transfer line 18 prior to mixing, although the particulate solids could be heated prior to mixing if desired. Preferably, the fluid is heated because of the greater ease in handling and heating fluids.

Upon measurement of the temperatures referred to above, determination of the amount of fluid flowing through transfer line 18 and determination of the heat capacities of the fluid flowing through line 18 and the particulate solids added to line 18, the amount of particulate solids added to line 18 can be calculated as follows:

$$W_c = (W_a \times C_{pa} \times (T_a - T_{ac}) / C_{pc} \times (T_{ac} - T_c))$$

where:

$W_c$ equals the amount of particulate solids in the mixture in line 18, $W_a$ equals the amount of fluid flowing through line 18, $T_a$ equals the temperature of the fluid flowing through line 18 prior to (upstream from) the addition of particulate solids to line 18, $T_c$ equals the temperature of the particulate solids added to line 18, prior to the addition of the particulate solids to line 18, $T_{ac}$ equals the temperature of the mixture flowing in line 18, $C_{pa}$ equals the heat capacity of the fluid flowing through line 18, $C_{pc}$ equals the heat capacity of the catalyst added to line 18.

By the use of the formula set forth above, the amount of particulate solids added to line 18 can be accurately determined. In the practice of the present methods, the flow of fluid is initiated and particulate solids are added at a selected rate. The temperature and amount of fluid an the amount of solids flowing through line 18 may be arbitrarily selected initially. Upon calculating the amount of solids flowing through line 14 into line 18, the flow rate of the particulate solids can be readily adjusted. By continuously or periodically checking the amount of solids flowing through line 18, the amount of solids added to the process through line 18 can be readily controlled.

In the practice of the present invention, the fluid may be selected from gases or liquids, depending upon the needs of the process user. For instance, if particulate solids are being transferred to a liquid process, it may be desirable to use a liquid as a transfer medium. The liquid may be either oleaginous or aqueous, depending upon the particulate solids transferred and the objectives of the user.

In other embodiments, it may be desirable to use a gas as a transfer fluid. One such embodiment is fluid catalytic cracking processes as discussed previously. Such processes are known to those skilled in the art and in general comprise the reaction of petroleum fractions with a selected particulate catalyst in a reaction zone followed by recovery of a spent catalyst stream from the reaction zone. The spent catalyst stream is recycled to a regeneration zone where it is treated to produce a regenerated catalyst, usually by burning carbonaceous materials from the catalyst, which is then returned to the reaction zone with fresh hydrocarbon feed. It is possible to add fresh catalyst at a variety of points in such processes. Desirably, the fresh catalyst is added by the use of air as a transfer fluid with the resulting mixture of particulate catalyst and air being injected into a transfer line to the regeneration zone or directly into the regeneration zone. In such case, the mixture of air and particulate catalyst is added to a stream of spent particulate catalyst. In the event that it is desired to add the fresh catalyst to the reaction zone, it is preferred that an oleaginous liquid compatible with the reactions in the reaction zone be used as a transfer fluid for the catalyst. Such variations are clearly within the skill of those in the art and need not be discussed further.

As shown in the FIGURE, a controlled 32 is in operative contact with each of the sensors discussed previously to receive and process information to produce a determination of the amount of particulate solids in line 18. This control may be accomplished manually by calculation of the amount of catalyst or other particulate solids in line 18 or the control may be accomplished by periodic or substantially continuous calculation of the amount of catalyst in line 18 by a computer or the like. In either event, a line 34 is shown for controlling valve 16 in responses to the determination of the amount of catalyst in line 18. Such accurate determination and control has hitherto been unavailable to the art. Previously, catalyst has been added to such processes by physically measuring the change in the height of the particulate solids in vessel 12, by the use of small pots which are manually filled with particulate solids and then discharged into a transfer line or the like. Such methods have been found to be inaccurate and cumbersome. Clearly, the use of the method of the present invention represents a substantial improvement in methods for the addition of particulate solids to a process.

Having thus described the invention by reference to certain of its preferred embodiments, it is pointed out that the embodiments discussed are illustrative rather than limiting in nature and many variations and modifications are possible within the scope of the present invention. Many such variations and modifications may be considered obvious and descriable by those skilled in the art upon a review of the foregoing description of preferred embodiments.

Having thus described the invention, I claim:

1. A method for adding controlled quantities of finely divided particulate catalyst to a fluid catalyst cracking process, said method consisting essentially of:
    (a) flowing a fluid through a transfer line to transfer said particulate catalyst to said process;
    (b) adding said particulate catalyst to said transfer line at a selected rate and at a temperature different than the temperature of said fluid to produce a mixture of said particulate catalyst and said fluid in said transfer line;
    (c) determining the temperature of said particulate catalyst prior to addition of said particulate catalyst to said transfer line;
    (d) determining the temperature of said fluid flowing through said transfer line prior to addition of said particulate catalyst to said transfer line;
    (e) determining the quantity of said fluid flowing through said transfer line;

(f) determining the heat capacity of said particulate catalyst and said fluid;

(g) determining the temperature of said mixture in said transfer line;

(h) calculating the amount of particulate catalyst in said mixture by the equation:

$$W_c = (W_a \times C_{pa} \times (T_a - T_{ac}) / C_{pc} \times (T_{ac} - T_c))$$

where:

$W_c$ equals the amount of particulate catalyst in said mixture, $W_a$ equals the amount of fluid flowing through said transfer line, $T_a$ equals the temperature of the fluid flowing through said transfer line prior to addition of said particulate catalyst to said transfer line, $T_c$ equals the temperature of the particulate catalyst added to said transfer line prior to addition of said particulate catalyst to said transfer line, $T_{ac}$ equals the temperature of the mixture flowing in said transfer line, $C_{pa}$ equals the heat capacity of the fluid flowing through said transfer line, $C_{pc}$ equals the heat capacity of the particulate catalyst added to said transfer line.

(i) controlling the rate of addition of said particulate catalyst to said transfer line to maintain a selected quantity of said particulate catalyst in said transfer line based upon said calculation.

2. The method of claim 1 wherein the difference between the temperature of said fluid ($T_a$) and the temperature of said particulate catalyst ($T_c$) is at least double the difference between the temperature of said mixture ($T_{ac}$) and the temperature of said particulate catalyst ($T_c$).

3. The method of claim 1 wherein the difference between the temperature of said fluid ($T_a$) and the temperature of said particulate catalyst ($T_c$) is at least about 50° F.

4. The method of claim 3 wherein said difference is at least about 100° F.

5. The method of claim 1 wherein said fluid is a gas.

6. The method of claim 5 wherein said gas is air.

7. The method of claim 6 wherein the difference between the temperature of said air ($T_a$) is from about 100 to about 150° F. greater than the temperature of said particulate catalyst ($T_c$).

8. The method of claim 6 wherein said mixture is added to a stream of spent particulate catalyst in said process.

9. The method of claim 6 wherein said mixture is passed to a catalyst regeneration vessel in said process.

10. The method of claim 1 wherein said fluid is a liquid.

11. The method of claim 10 wherein said liquid is an oleaginous liquid.

12. The method of claim 6 wherein said mixture is passed to a catalytic cracking vessel in said process.

* * * * *